United States Patent [19]

Kyung et al.

[11] 4,372,934

[45] Feb. 8, 1983

[54] PRODUCTION OF ISOCYANIC ACID

[75] Inventors: Jai H. Kyung, Dublin; Phyllis L. Brusky, Columbus, both of Ohio

[73] Assignee: Ashland Oil, Inc., Ashland, Ky.

[21] Appl. No.: 385,422

[22] Filed: Jun. 7, 1982

[51] Int. Cl.³ .......................... C01C 3/00; C01C 3/14
[52] U.S. Cl. .................................... 423/365; 252/443; 252/457; 252/458; 252/460; 252/465; 252/466 PT; 252/466 B; 252/470; 252/473; 252/474
[58] Field of Search ................ 423/365; 252/443, 457, 252/458, 460, 465, 466 PT, 466 B, 470, 473, 474

[56] References Cited

U.S. PATENT DOCUMENTS 4,174,377  11/1979  Trimble et al. ..................... 423/365

Primary Examiner—O. R. Vertiz
Assistant Examiner—Wayne A. Langel
Attorney, Agent, or Firm—William Kammerer

[57] ABSTRACT

Isocyanic acid is formed directly from nitric oxide, carbon monoxide and hydrogen by contacting a supported bifunctional iridium or rhodium metal catalyst at an elevated temperature with a feed stream of said reactants.

8 Claims, No Drawings

PRODUCTION OF ISOCYANIC ACID

BACKGROUND OF THE INVENTION

Field of the Invention

This invention relates to a method for preparing isocyanic acid.

DESCRIPTION OF THE PRIOR ART

An existing method for producing isocyanic acid consists of pyrolyzing cyanuric acid or urea. The method suffers because of the high processing temperatures called for and the need to use relatively costly intermediates as starting raw materials. Another commercially unattractive method involves the extended controlled addition of a mineral acid to potassium cyanate.

Although the current uses of isocyanic acid are rather limited, there is however, the potential usage to prepare aliphatic isocyanates which have extensive industrial application. Accordingly, there is a need for an economical way of producing isocyanic acid particularly if it is to be used as an intermediate in preparing a commodity chemical such as the organic isocyanates.

The genesis of the approach to prepare isocyanic acid in accordance with the chemistry concerned herein is to be found in a number of related papers which began to appear in the early part of the last decade. One of the forerunners of these articles in Unland, M. L., J. Phys. Chem. 77, 1952 (1973). The latter reported work was directed to a study of the reductive removal of nitric oxide from auto exhaust through the agency of a noble metal catalytic converter system. The most significant finding of this study was that carbon monoxide and nitric oxide combined at elevated temperatures to form a complex isocyanate species on the surface of the noble metal catalyst.

The first potential industrial application of the above finding is set forth in U.S. Pat. No. 4,174,377. Therein it is taught that a variety of cyanate compounds, including isocyanic acid, can be prepared directly by contacting a noble metal hydrogenation catalyst at an elevated temperature with a feed stream of nitric oxide, carbon monoxide and a source of hydrogen. The present invention represents an improvement over the foregoing prior art particularly in the area of enhancing the yield of isocyanic acid by employing a supported heterogeneous catalyst designed to beneficially control the hydrogenation phase of the underlying reaction.

SUMMARY OF THE INVENTION

In accordance with this invention, a method is provided for preparing isocyanic acid by the direct in situ formation thereof from nitric oxide, carbon monoxide and hydrogen. The method comprises contacting a supported bifunctional iridium or rhodium metal catalyst at an elevated temperature with a feed stream consisting essentially of said reactants. In addition to the specific doped noble metal catalysts contemplated, an important collateral aspect of the invention resides in the nature of the support or carrier component. A plurality of conventional particulate catalyst carriers are useful herein provided the surface are exhibited thereby in terms of square meters per gram does not exceed about one.

The gist of the present invention, however, resides in the discovery that a dopant matal dispersed in a non-alloyed form throughout the indicated noble metal catalyst basically serves to moderate the hydrogenation reaction in the course of freeing the complex isocyanate species. The net result of this moderating effect is to enhance the yield of isocyanic acid by suppressing the formation of other hydrogenation products such as urea and ammonium carbonate.

DESCRIPTION OF THE PREFERRED EMBODIMENTS

It has been documented in the early prior art referred to hereinabove that nitric oxide and carbon monoxide react to form the isocyanate species on the surface of the applicable metal catalysts. It has also been observed by infrared spectroscopy that, where the catalyst metal is supported, the engendered isocyanate species is prone to migrate almost instantly to the surface of the support. This phenomenon poses a difficulty since the support-isocyanate species bond is a comparatively strong one thereby rendering it difficult to free the isocyanate species as isocyanic acid by hydrogenation. When the isocyanate species is attached to the support the hydrogenation products are principally urea and ammonium carbonate.

Migration of the isocyanate species can be substantially impeded by providing a support matrix wherein the catalyst metal, specifically, the doped iridium or rhodium black, is dispersed throughout in the form of comparatively large clusters or agglomerates. In this manner, isocyanate species can be hydrogenated while residing on the surface of the catalyst metal thereby more favorably tending to yield the desired isocyanic acid.

A variety of commercially available catalyst carriers are useful in the foregoing context. The only requirement in the selection of a suitable carrier particulate is that its surface area characteristic in terms of square meters per gram ($m^2/g$) does not exceed about one. The composition of the carrier appears to be of no particular consequence. Thus all of the conventional catalyst support materials are applicable. These include silica, $\gamma$-alumina, zirconium oxide and silicon carbide. The preferred carriers are silica and $\gamma$-alumina.

As previously pointed out the concept behind the present invention is that of providing a bifunctional catalyst which serves to control the hydrogenation reaction in the course of freeing the complex isocyanate species. The net result of this control is that the selectivity toward the formation of the desired isocyanic acid is substantially favored. In other words, the tendency to hydrogenate beyond the indicated acid to urea and ammonium carbonate is materially suppressed. The contemplated bifunctional catalysts comprise doped iridium or rhodium black wherein the dopant metal is homogeneously dispersed in a non-alloyed form throughout the catalyst metal. Applicable dopant metals include nickel, zinc, copper, cobalt, chromium, iron, cadmium and silver. The amount of the dopant metal in relation to the iridium or rhodium metal catalyst is not to exceed about 2 mole percent. A preferred range is from 0.1–1 on the indicated basis.

The procedure for preparing the supported catalyst follows the general practice whereby the carrier is impregnated with an aqueous solution of a salt of the noble metal and a salt of the dopant metal thereupon calcined to provide the metal deposit sites. The noble metal is then activated by contact with hydrogen at an elevated temperature. Suitable metal contents of the supported catalyst range from about 1 to 10 weight percent. The preferred metal content is in the order of about 3 percent. The preparation of a supported catalyst will be illustrated in the working example given hereinbelow.

The procedure for carrying out the reaction in generating the isocyanic acid is straightforward. The reactants; viz., hydrogen, nitric oxide and carbon monoxide, are introduced directly into a reaction sphere wherein the reaction temperature is maintained between about 200° and 400° C. The preferred operating temperature is from 250° to 300° C. The mole ratio of nitric oxide to carbon monoxide in the reactant feed stream broadly ranges from 1:1 to 1:20, respectively. A preferred molar ratio of the indicated reactants in the order referred to is from 1:2 to 1:16, respectively. The molar amount of hydrogen based on the content of nitric oxide present in the reactant feed stream broadly ranges from 0.5 to 5 and more preferably from 1 to 2. Pressure conditions applicable are essentially ambient with only moderately elevated pressures observed to maintain a reactant flow rate to achieve a desired contact time. Another means to regulate contact time is through the use of an inert diluent gas as a component of reactant feed stream. Applicable contact time is from about 0.05 to 0.5 seconds.

EXAMPLE I

This example serves to illustrate a method for preparing a supported doped noble metal catalyst useful in the practice of this invention.

A low surface area silica (Carborundum SMC, surface area, 0.3 m²/g) was ground to 20-35 mesh. Hexachloroiridic acid in the amount of 1.564 g along with 0.0094 g of $NiNO_3.6H_2O$ were dissolved in 13 ml of deionized water and the resultant solution was added to 21 g of silica by an incipient wetness method in a round bottomed flask. The slurry was mixed on the rotary evaporator under atmospheric pressure for even coating at room temperature for 30 minutes. The slurry was then stripped of water under an aspirator vacuum to dryness in a warm water bath. The loaded catalyst was activated in a Vycor tube under the following conditions: slowly heated to 400° C. over a period of 4 hours under vacuum; heating at 400° C. under 100 mm oxygen atmosphere for 90 minutes; evacuating the tube under full vacuum; holding under 100 mm hydrogen atmosphere for 1 hour and then cooling to room temperature under vacuum.

EXAMPLE II

This example primarily illustrates the process for preparing isocyanic acid in accordance with the invention. A series of runs were conducted using variously doped iridium metal catalysts, all supported and prepared as described for the representative catalyst of Example I.

A standardized procedure was observed in conducting the individual test runs. A down-flow glass reactor tube equipped with a frit was utilized. The catalyst consisting of doped 3% iridium on a γ-alumina support (Carborundum SMC) prepared in the general manner described in Example I in the amount of a 3.5 g bed was supported on the frit and surrounded by a glass wool blanket. The individual catalyst samples were preliminarily conditioned under hydrogen flow (80 vol. % H₂, 20 vol. % N₂) at 400° C. for 2 hours. The temperature was lowered to the indicated reaction temperature under a helium flow whereupon the reactants (mole ratio H₂:NO:CO=1:1:16) were proportioned into the helium flow and the resultant feed stream passed through the catalyst bed. The reaction effluent was passed through a dry ice-isopropyl alcohol cooled trap. Isocyanic acid was collected in a dry ice trap and the purity was determined by melting point and infrared spectroscopy of the trimerized isocyanic acid. Urea and other solid product were recovered before the dry ice trap. Yield figures reported were based on the NO feed not consumed in the reaction. Further details pertaining to the individual test runs including the identity of the dopant metal and the results obtained are set forth in the following Table I.

TABLE I

| Run No. | Dopant Metal | Dopant Level (mol %) | Rx Conditions Temp. (°C.) | Contact Time (sec)[1] | % Yield HNCO | % Yield Urea |
|---|---|---|---|---|---|---|
| 1 | None | — | 350 | 0.11 | 13 | 37 |
| 2 | " | — | 300 | 0.12 | 10 | 39 |
| 3 | " | — | 275 | 0.13 | 12 | 11 |
| 4 | " | — | 250 | 0.14 | — | 1.3 |
| 5 | Nickel | 1.0 | 350 | 0.10 | 31 | 1.1 |
| 6 | " | " | 300 | 0.11 | 27 | 5.3 |
| 7 | Zinc | 1.0 | 350 | 0.10 | 36 | — |
| 8 | " | " | 300 | 0.11 | 36 | 3.5 |
| 9 | " | 2.0 | 350 | 0.10 | 34 | — |
| 10 | " | " | 300 | 0.11 | 8.6 | — |
| 11 | Copper | 1.0 | 350 | 0.11 | 35 | — |
| 12 | " | 2.0 | 350 | 0.10 | 22 | — |
| 13 | " | " | 300 | 0.11 | 13 | — |
| 14 | Cobalt | 0.5 | 350 | 0.10 | 34 | 5.5 |
| 15 | " | " | 300 | 0.11 | 18 | 7.2 |
| 16 | " | 1.0 | 350 | 0.10 | 29 | — |
| 17 | " | " | 300 | 0.11 | 23 | — |
| 18 | " | 2.0 | 350 | 0.10 | 33 | — |
| 19 | " | " | 300 | 0.11 | 22 | 11 |
| 20 | Chromium | 1.0 | 350 | 0.10 | 17 | 4 |
| 21 | " | " | 300 | 0.11 | 22 | 5.6 |
| 22 | Iron | 1.0 | 350 | 0.10 | 19 | — |
| 23 | " | " | 300 | 0.11 | 25 | — |
| 24 | " | " | 250 | 0.12 | 5.1 | — |
| 25 | Silver | 1.0 | 350 | 0.10 | 10 | — |
| 26 | " | " | 300 | 0.11 | 15 | 1.2 |
| 27 | Cadmium | 1.0 | 350 | 0.10 | 15 | 1.5 |

[1] Contact Time = $\frac{273 \text{ K} \times V}{n \times 22.4 \text{ (L/mole)} \times T}$ V: catalyst volume (L)
n: total number of moles of gas charged (mole/sec)
T: reaction temperature (K)

What is claimed is:

1. A process for preparing isocyanic acid which comprises reacting a mixture of nitric oxide, carbon monoxide and hydrogen at a temperature of from about 200° to 400° C. in the presence of a doped iridium or rhodium metal catalyst supported on a particulate carrier selected from the group consisting of silica, γ-alumina, zirconium oxide and silica carbide, said carrier further characterized in having a surface area, expressed as m²/g, of not in excess of one, and wherein said dopant is selected from the group consisting of Ni, Zn, Cu, Co, Cr, Fe, Cd and Ag metal with the dopant metal present to the extent of 0.1-2 mol % based on said metal catalyst.

2. The process according to claim 1 wherein the metal catalyst is iridium.

3. The process according to claim 2 wherein said particulate carrier is γ-alumina.

4. The process according to claim 2 wherein said particulate carrier is silica.

5. The process according to claim 3 or 4 wherein the dopant metal is nickel.

6. The process according to claim 3 or 4 wherein the dopant metal is zinc.

7. The process according to claim 3 or 4 wherein the dopant metal is copper.

8. The process according to claim 3 or 4 wherein the dopant metal is cobalt.

* * * * *